United States Patent [19]
Sun et al.

[11] Patent Number: 5,870,363
[45] Date of Patent: Feb. 9, 1999

[54] OPTICAL DISK MOTOR SERVO AND METHOD FOR CLOSED LOOP SPEED CONTROL

[75] Inventors: Kai C. K. Sun, Saratoga; John L. Grimsley, Los Altos, both of Calif.

[73] Assignee: Oak Technology, Inc., Sunnyvale, Calif.

[21] Appl. No.: 736,960

[22] Filed: Oct. 25, 1996

[51] Int. Cl.$^6$ ..................................................... G11B 7/00
[52] U.S. Cl. ............................................... 369/50; 369/47
[58] Field of Search .................................... 369/50, 53, 47, 369/48, 58, 124

[56] References Cited

U.S. PATENT DOCUMENTS

| 4,510,423 | 4/1985 | Iwasawa | 318/331 |
| 4,530,083 | 7/1985 | Ishihara | 369/267 |
| 4,546,461 | 10/1985 | Isobe | 369/50 |
| 4,789,975 | 12/1988 | Taniyama | 369/50 |
| 4,908,810 | 3/1990 | Oie | 369/50 |
| 5,182,741 | 1/1993 | Maeda et al. . | |
| 5,216,647 | 6/1993 | Kitani | 369/50 |
| 5,220,551 | 6/1993 | Tateishi et al. | 369/50 |
| 5,388,085 | 2/1995 | Jaquette . | |
| 5,412,629 | 5/1995 | Shirane . | |
| 5,425,014 | 6/1995 | Tsuyuguchi . | |
| 5,521,895 | 5/1996 | Miura . | |
| 5,528,574 | 6/1996 | Takeuchi et al. . | |
| 5,544,134 | 8/1996 | Yamamuro . | |
| 5,627,811 | 5/1997 | Morita et al. | 369/47 |

FOREIGN PATENT DOCUMENTS 0 123 946  3/1984  European Pat. Off. .
04-PD-60018  3/1996  Japan .

*Primary Examiner*—Thang V. Tran
*Attorney, Agent, or Firm*—Townsend and Townsend and Crew LLP

[57] ABSTRACT

An optical disk drive in which changes in rotational speed are achieved under closed loop control, avoiding significant undershoots or overshoots in speed, increasing access time and reducing power. The speed control is suitable for use in a CLV system, in an CAV/CLV scheme, or in any system in which the speed of the disk must be changed at various times. Feedback from the motor, rather than data read from the disk, determines and controls motor speed during all search operations. The disk motor servo determines the desired motor speed for a target track through a speed profile table. The speed profile table can be designed to accommodate a combination of CAV mode and CLV mode of operation such that the disk drive system can run at the maximum data transfer rate permitted by the data processing electronics, or to minimize power consumption. Through closed loop control, the system ensures that the speed of the motor is quickly and accurately changed to the desired speed, typically by the time the optical pickup reaches a target track during a search operation. The closed loop control also allows the disk drive system to be designed for a lower tolerance level and still achieve jitter-free control. Thus the data rate can be increased due to the lower tolerance required. The access time is minimized because the CD-DSP can begin retrieving data as soon as the target track is reached, since the optical disk will generally already at the desired speed.

18 Claims, 5 Drawing Sheets

OPTICAL DISK MOTOR SERVO AND METHOD FOR CLOSED LOOP SPEED CONTROL

TECHNICAL FIELD

This invention relates to a method and an apparatus for operating an optical disk drive, and more particularly to a novel method and apparatus for providing rotational speed control to the optical disk drive in a closed loop manner when changing the optical disk velocity.

BACKGROUND

Compact disks (CD), a type of optical disk, are widely used to store digital data of an audio signal or music information. The music is reproduced from the CD through a compact disk player. Optical disks have been adopted to store a variety of digital data besides audio signals. For instance, a CD-DA is used to store digital audio information; a CD-V is used to store video information such as movies, video clips and Keraoki. Another commonly recognized application of the optical disk in the data processing industry is the CD-ROM. The CD-ROM is a read-only data storage medium used in personal computers for storing digitized information such as large text databases and application programs. CD-ROMs are especially suitable for multimedia applications because of its voluminous storage capability, durability, and low cost. Although the traditional optical disk is a read-only medium used for data reproduction only, optical disks capable of both recording and reproduction have been developed. The CD-R and CD-E are both read/write optical storage mediums. An optical disk drive is used to record or reproduce the digital data onto or from these optical disks.

FIG. 1 shows a simplified block diagram of a typical prior art optical disk drive system used to reproduce data from a CD-ROM. In optical disk drive system 10, CD-ROM disk 12 is rotated by spindle motor 14; optical pickup unit 20 (denoted OPU in FIG. 1) reads the data stored on CD-ROM 12; feed motor (or "sled motor") 22 changes the radial position of optical pickup unit 20; microprocessor controller 40 and a collection of servo and control circuitry command disk drive 10 to perform the desired operations. CD-DSP 30 is a digital signal processor which descrambles the signal read from CD-ROM 12 by optical pickup unit 20 and provides, via CD-ROM controller 39, the digital output data via bus 44 to host computer 50. CD-ROM controller 39 is typically an ATAPI/IDE or SCSI based device, as is well known in the personal computer field.

A CD-ROM disk stores data in the form of pits and lands patterned in radial tracks. The tracks are formed in one spiral line extending from the inner radius of the disk to the outer edge. Unlike typical magnetic disk storage media which stores data in concentric tracks in which data density is more sparse at the outer edge of the disk, CD-ROM records data at a uniform density over its entire surface, that is the same high density of data is stored at an outer track as at an inner track. The uniform density storage pattern accounts for its large data storage capacity over that of the magnetic disk storage media. To facilitate data access in a uniform density storage pattern, the CD-ROM disk is designed to rotate at a constant linear velocity (CLV). In the CLV mode, the rotational speed of the disk varies according to the location of the track to be read so that a constant linear speed is maintained between the disk and the optical pickup unit. Maintaining a constant linear speed between the disk and the optical pickup at all locations on the disk means that the data transfer rate also remains constant at all locations, enabling a uniform density of data to be stored over the entire surface of the disk. In contrast, the magnetic disk storage media are designed to rotate at a constant angular velocity (CAV) where the rotational speed of the disk is kept constant. When operated in a CAV mode, the linear velocity of the disk relative to the optical pickup increases linearly as the read head approaches the outer track. The first CAV mode magnetic disk drives required that the amount of data recorded in a given angular rotation be kept the same throughout the disk. Therefore, the average data transfer rate will increase linearly as the optical pickup travels from the inner radius to the outer edge of the CD-ROM. More modern magnetic disk drives using CAV also use zone bit recording to improve storage capacity by increasing data density per angle of disk rotation as track location increases in distance from the center of the disk.

The advantage of high storage capacity of the CLV mode is offset by the longer access time required to reach a target track in a search operation as compared to the CAV mode. In the CLV mode, the time required to change the rotational speed of the disk whenever different tracks are accessed increases the access time significantly. When a CD-ROM is operated at 1× speed (representing the CD-ROM data transfer rate standard of 150 Kbytes/second), the rotational speed of the disk must change from approximately 500 rpm (rotations per minute) when an inner track is to be accessed to approximately 216 rpm when an outer track is to be accessed. In order to provide acceptable and jitter free performance, robust electronics are used in CD-ROM drives which allow reading data from a track when the spindle motor has reached its proper speed associated with that track, within a margin of ±50%. This allows reading of the desired track to occur somewhat sooner, and allows the final speed adjustments for that track to be made under closed loop control during the read operation. Since the data rate will not be correct when the motor speed is not correct, the electronics must be robust to allow for this improper data rate. To accommodate the frequent adjustments in rotational speed, a complex high performance, and thus expensive, spindle motor is required. The motor must be capable of generating more power, or producing more torque to reach a target speed quickly, and overcoming more friction. This is particularly true as CD-ROM operation speed increases. Today, it is common to run CD-ROMs at 8× speed or higher. At 8× speed, the rotational speed of the CD-ROM changes from near 4000 rpm at the inner track to about 1728 rpm at the outer track. At this rapid rotation rate, effective control of the speed of the motor becomes critical, especially for reducing the access time in a search operation. Furthermore, as CD-ROM speed increases, the design of the CD-DSP becomes increasingly difficult of the ±50% speed tolerance is to still be achieved. This ±50% guardband also limits the data rate possible under proper motor speed.

Conventional optical disk drive systems use open loop control of the motor speed in search operations and closed loop control during normal play or track following. In an open loop control, the spindle motor is driven in a kick and brake manner for changing the rotational speed as illustrated in FIG. 2. FIG. 2 shows a family of curves representing the rotational speed of the motor as a function of the radius of the optical disk. Curves 60, 62 and 64 depict the increase in rotational speed with respect to increasing CD-ROM speed from 8× to 16×, when the CD-ROM is operated in a CLV mode across a variety of radiuses. When a track closer to the circumference of the disk is to be assessed, such as when the optical pickup must move from point A to point B, the motor must reduce the rotational speed of the disk. Therefore, a brake operation is initiated to decelerate the motor. Due to the presence of back EMF at the motor, it takes longer to accelerate the motor than to decelerate it a given change in rpm. Thus, the brake operation is typically terminated when the rotational speed is still above desired value, as indicated by point B1 in FIG. 2. Then, the rotational speed is further reduced to the desired value in fine increments by subsequent brake operations, until CD DSP 30 is able to synchronize with the sub-code bits stored on the desired track (typically when the speed reaches ±50% of the proper speed, due to the large tolerances built into the data recovery electronics), at which time closed loop speed control is used, based on the sub-code sync signal. It is highly undesirable to reduce the rotational speed too much as shown by point B2 because the motor must then be accelerated to the desired value at B by one or more kick operations, increasing the access time significantly. The converse is true when a track closer to the disk center is to be accessed, as illustrated by points C and D. The spindle motor must be accelerated as the optical pickup moves towards the center of the disk. The desired procedure is to accelerate the motor to above the desired value (i.e. to point D2) and then decelerate it in fine increments by subsequent brake operations to the desired speed (point D). This open loop control system is problematic because both time and power are wasted because the motor speed adjustments must be made with unavoidable overshoots and undershoots.

Contrary to the CLV mode, the CAV mode is characterized by very fast access time, i.e. the time required to move the optical pickup radially to a desired track and establish valid reading of data from that track at a tolerable spindle motor speed. Because the rotational speed is kept constant, the optical pickup can immediately retrieve disk data when the target track is reached. CAV mode operates without the added delay of waiting for the spindle motor speed to settle to the correct rpm.

In order to improve the data rate and access time of an optical disk drive under certain circumstances, various operating modes other than simply CLV have been suggested. FIG. 3–1 shows a graph depicting, in relative terms, the rotational speed and resulting data rate in a CLV mode of operation, as tracks are read from the inner diameter to the outer diameter of the CD-ROM. Since it is a CLV system, the rotational speed S1 decreases from the inner diameter to the outer diameter of the CD-ROM, and the data rate remains substantially constant. The substantially constant data rate makes for relatively simple data recovery circuitry, although as previously described the fact that a different rotational speed S1 is required for different tracks results in delays in access time as track changes are made.

Another prior art system, such as described in U.S. Pat. No. 5,388,085, uses a modified CAV (MCAV) method wherein the disk is rotated at a constant angular velocity while the data transfer rate is varied according to the radial position of the track accessed. FIG. 3–2 depicts this constant angular velocity as curve S2, and the resulting data rate D2 which increases proportionally from the inner diameter to the outer diameter of the CD-ROM.

A more commonly used approach involves a combined CAV/CLV scheme where the optical drive operates in a CAV mode at the inner tracks and switches to a CLV mode at the outer tracks. FIG. 3—3 is a graphical representation of the rotational speed profile, and the resulting data rate, of such a CAV/CLV system. As shown in FIG. 3—3, the constant angular velocity at the inner diameter tracks, as depicted by curve S3, is limited by the rotational speed of the drive motor and related mechanical components. At a certain point, the data rate is limited by the electronic components in the data recovery circuitry, resulting in a maximum data rate, as depicted by curve D3. In order to not increase the data rate further, at this point, the CD-ROM is operated in a CLV mode, with the rotational speed decreasing as tracks closer to the outer diameter of the CD-ROM are read. Although the CAV/CLV scheme has a lower data transfer rate at the inner tracks due to the maximum rotational speed of the motor, and related mechanical constraints due to vibration, etc., the resulting in overall system performance is acceptable and greater than the data transfer rate under CLV control over the entire CD-ROM since the need for motor speed adjustments within the CAV operating portion of the curves of FIG. 3—3 is precluded.

U.S. Pat. No. 5,521,895 describes a system in which normal data reading is performed under CLV control, and changes in rotational speed are achieved by increasing the speed to a fixed CAV speed and subsequently decelerating to the speed necessary to continue the CLV operation at the new track location.

To reap the maximum benefit of a CAV/CLV operation scheme, there is still a need to have accurate control of the angular velocity of the motor, since as depicted in FIG. 3—3, rotational speed adjustments are needed when changing tracks within the CLV portion of curve S3, or changing between the CAV and CLV portions of curve S3. Note that it is common to break the CLV portion of curve S3 into a plurality of zones (not shown) so that the CLV portion of the curve is not truly linear, but rather is approximated in a stair-step fashion. Nonetheless, there are a number of discreet motor speed values within the CLV portion of curve S3, necessitating changes in the motor speed when reading tracks within different zones.

Today's disk drive systems are required to provide for a +/−50% tolerance in order to meet the jitter-free control requirement. That is, the optical pickup must be able to read data even if the rotational speed is +/−50% of the target speed. The large tolerance level imposes design constraints on the disk drive electronics. It is desirable to reduce the tolerance level so as to remove unnecessary design constraints, particularly as the speed of the CD-ROMs increase to 8× and greater. In order to maintain proper control of the motor speed, there is a need to monitor the actual rotational speed of the motor. Current disk drive systems rely on reading a subcode sync signal from the disk which indicates the linear velocity of the track being read, and thus motor speed. This method depends on the optical pickup unit being able to accurately read the subcode sync signal from the CD-ROM and the CD-DSP (FIG. 1) being able to quickly descramble the signal. This sub-code is formed of 98 bits, with one frame of data stored on the CD-ROM containing one of the bits forming the sub-code. Thus, 98 frames of data must be read in order to obtain the 98 bits forming the sub-code. This method is time consuming and becomes increasingly inaccurate as CD-ROM speed increases. Thus, it is desirable to have some other method of monitoring the spindle motor speed.

Regardless of the method used in the prior art for selecting the desired rotational speed associated with each track on a CD-ROM being read, changes in rotational speed are performed in open loop fashion, using kick and brake operations. As previously described, in the more sophisticated prior art systems, care is taken not to undershoot a desired rotational speed, since acceleration is more time and power consuming than deceleration. Thus, by virtue of this open loop control, and the successive brakes required to fine tune the deceleration to achieve the desired rotational speed, changes in rotational speed are time consuming, thereby having a deleterious effect on the access time of CD-ROMs.

SUMMARY

The present invention provides an optical disk drive for operating an optical disk, such as a CD-ROM, in which changes in rotational speed are achieved under closed loop control, thereby avoiding significant undershoots or overshoots in rotational speed, thus increasing access time and reducing power consumption. The novel rotational speed control of the present invention is suitable for use in a CLV system, in an CAV/CLV scheme, or in any system in which the rotational speed of the disk must be changed at various times. The present invention relies on feedback from the motor, rather than data read from the disk, to determine and control the actual angular velocity of the motor. Because the motor speed feedback is more accurate than optical pickup readings used in the prior art, especially at CD-ROM speed 8x or greater, the disk drive system of the present invention is capable of providing accurate and rapid control of the motor angular velocity. The disk drive system of the present invention comprises a novel disk motor servo which implements a closed loop control using the motor speed feedback during all search operations. In accordance with the present invention, the disk motor servo determines the desired motor speed for a target track through a speed profile table, which may be stored in microprocessor memory. The flexible speed profile table can be designed to accommodate a combination of CAV mode and CLV mode of operation such that the disk drive system can run at the maximum data transfer rate permitted by the data processing electronics. The speed profile can be also be designed to minimize the power consumption of motor control circuitry.

Through the closed loop control using the motor speed feedback, the disk drive system ensures that the rotational speed of the motor will be quickly and accurately changed to the desired speed, typically by the time the optical pickup reaches a target track during a search operation. The closed loop control of this invention also allows the disk drive system to be designed for a lower tolerance level and still achieve jitter-free control. Thus the data rate can be increased over the prior art due to the lower tolerance required. The access time is minimized because the CD-DSP can begin retrieving data as soon as the target track is reached, since the optical disk will generally already be rotating at the desired speed.

BRIEF DESCRIPTION OF THE DRAWINGS

Additional objects and features of the invention will be more readily apparent from the following detailed description and appended claims when taken in conjunction with the drawings, in which:

FIGS. 3–1 through 3—3 are graphs showing representative rotational speeds and data rate profiles for various CD-ROM operating schemes.

DESCRIPTION OF SPECIFIC EMBODIMENTS

Figure 1:
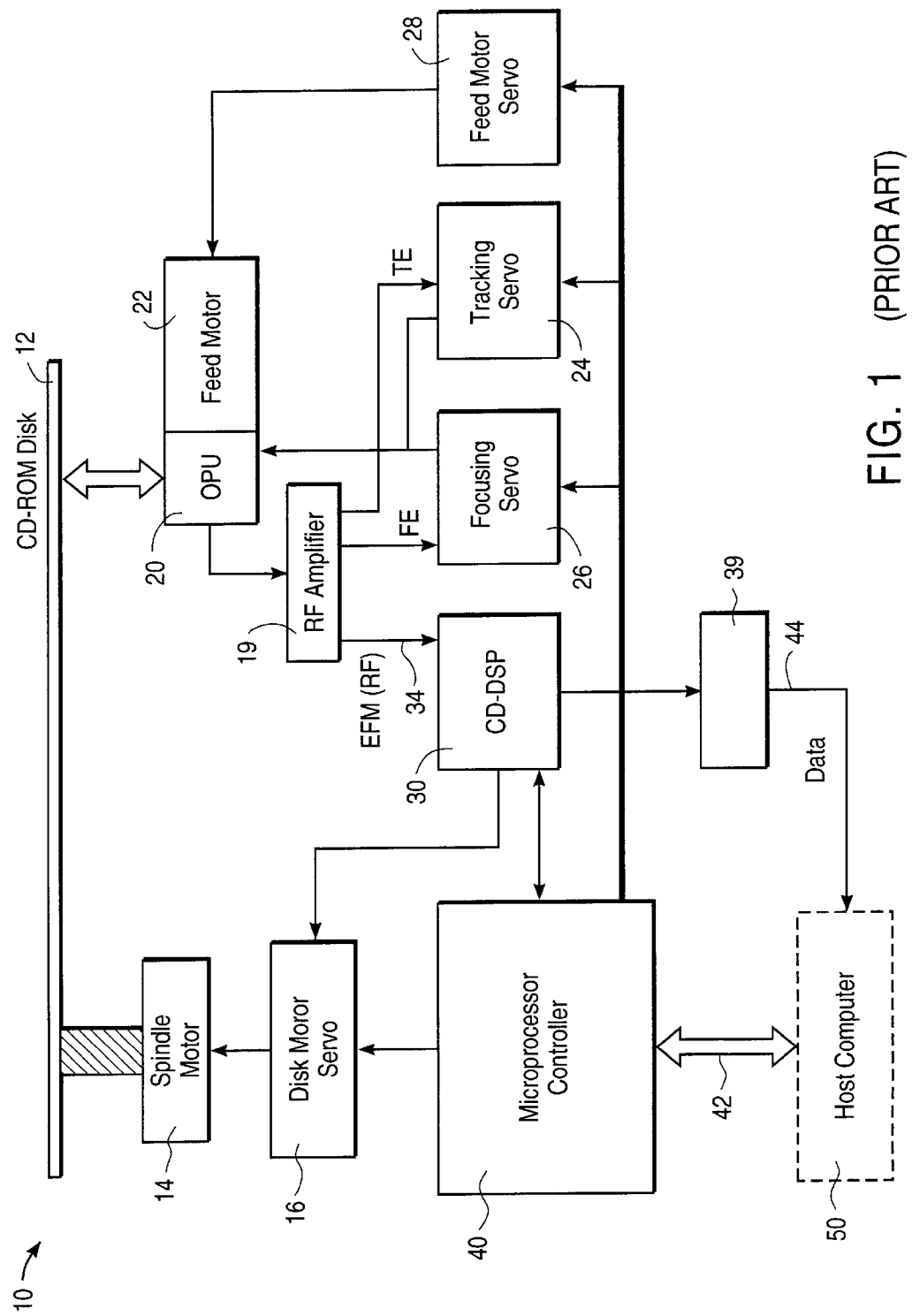
FIG. 1 is a simplified block diagram of a conventional optical disk drive system of the prior art.
Figure 2:
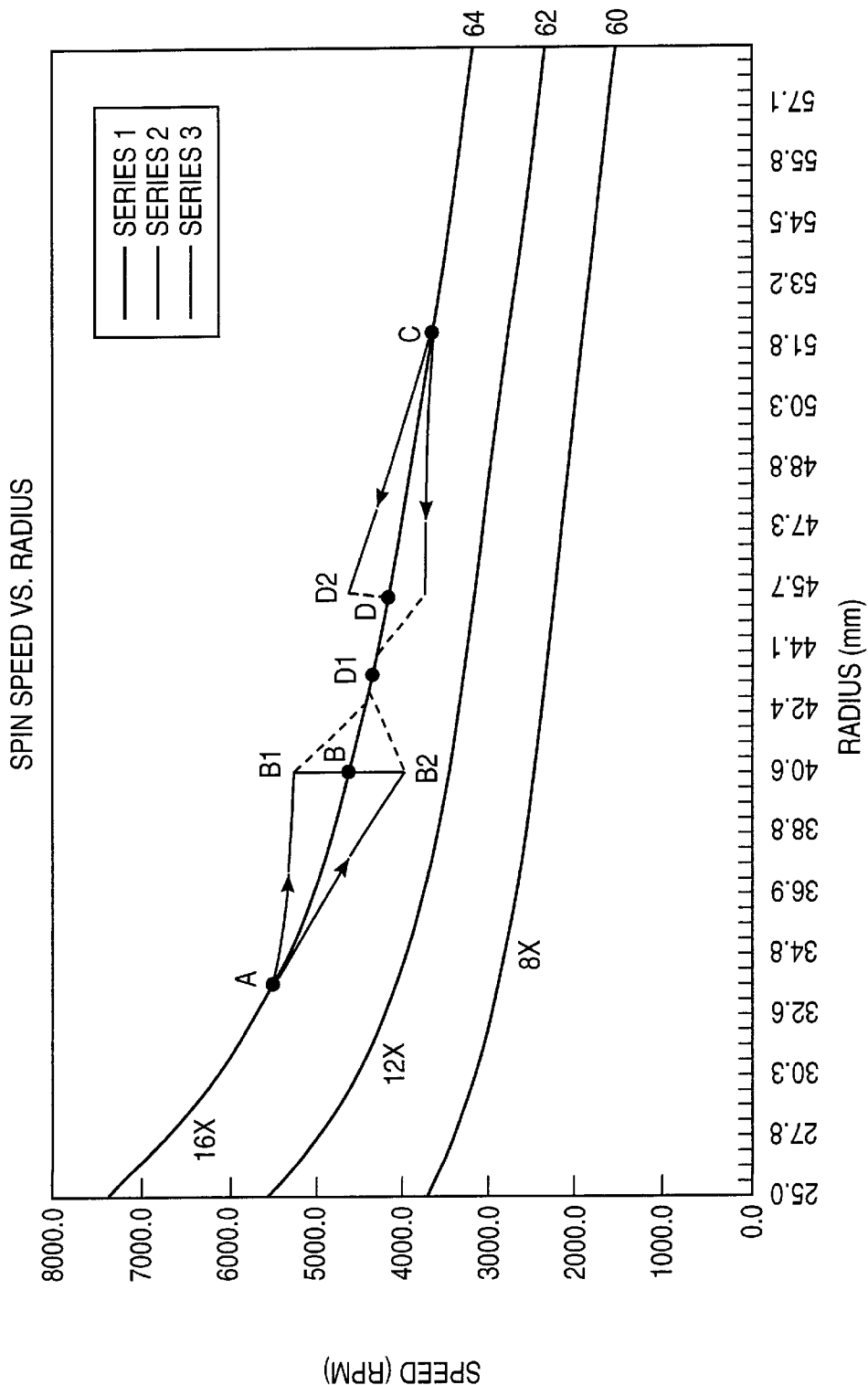
FIG. 2 is a graph showing the relationship between the rotational speed and the radius of the optical disk in a CLV mode.

The disk drive system of the present invention involves providing a novel disk motor servo, rather than the prior art disk motor servo 16 of FIG. 1, to control the angular velocity of the spindle motor. When used with a disk drive system similar to system 10 as shown in FIG. 1, the novel disk motor servo of the present invention controls spindle motor 14 to rotate interchangeably between a CAV mode and a CLV mode. In addition to control commands, disk motor servo 116 of this invention receives speed profile information from microprocessor controller 40 (FIG. 1) which defines the desired angular velocity of spindle motor 14 at the target track. Disk motor servo 116 of this invention also receives input signals from CD-DSP 30. CD-DSP 30 reads the Eight-to-Fourteen (EFM) signal produced by optical pickup unit 20 and amplified by RF Amplifier 19 and generates a subcode sync signal. The subcode sync signal indicates the linear velocity of the spindle motor and is used by disk motor servo 116 of the present invention to operate spindle motor 14 in the CLV mode.

Figures 1, 3:
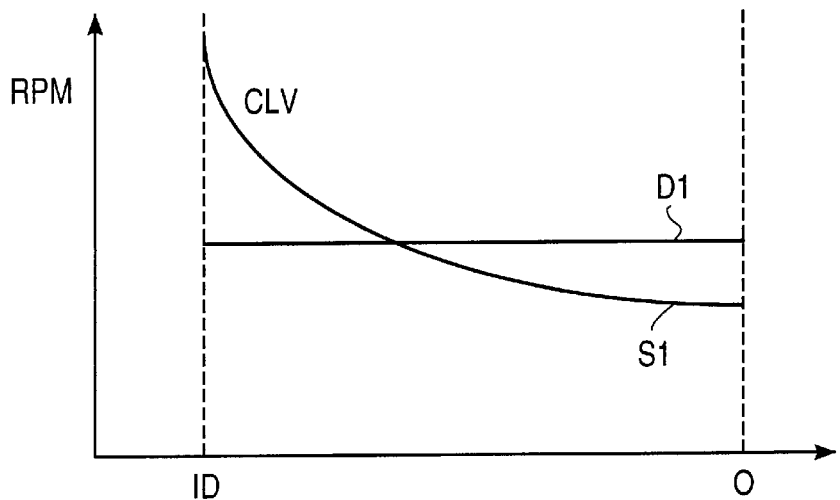
Figures 2, 3:
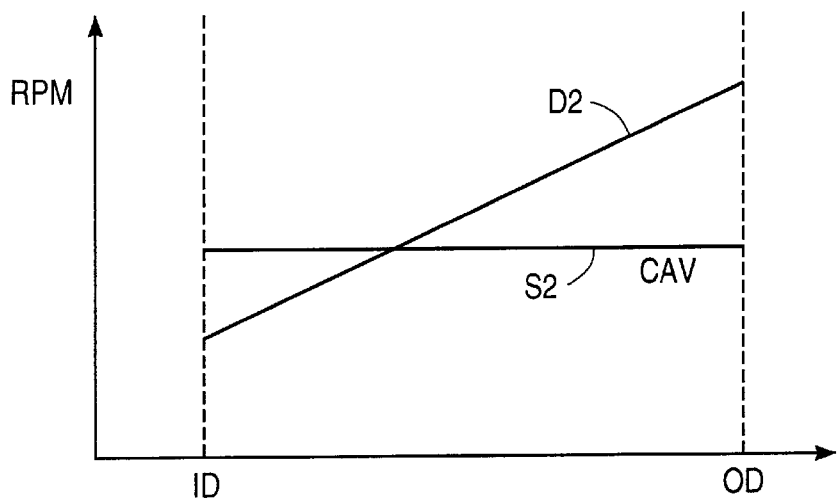
Figure 3:
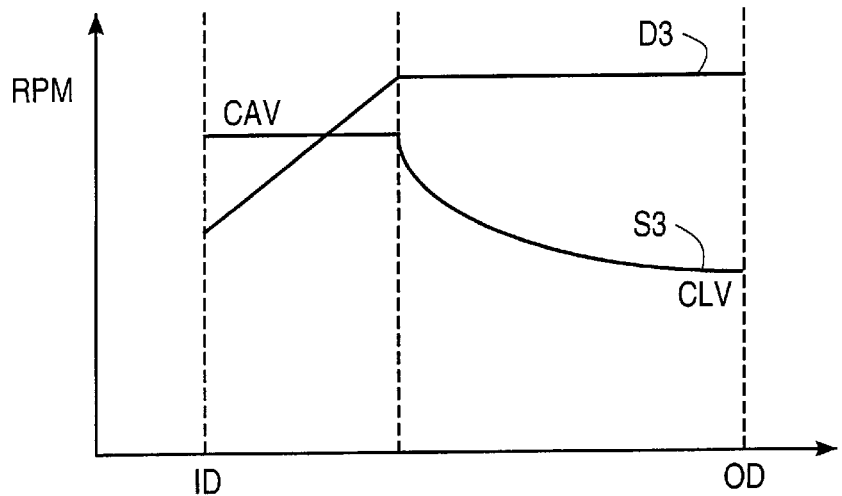
Figure 4:
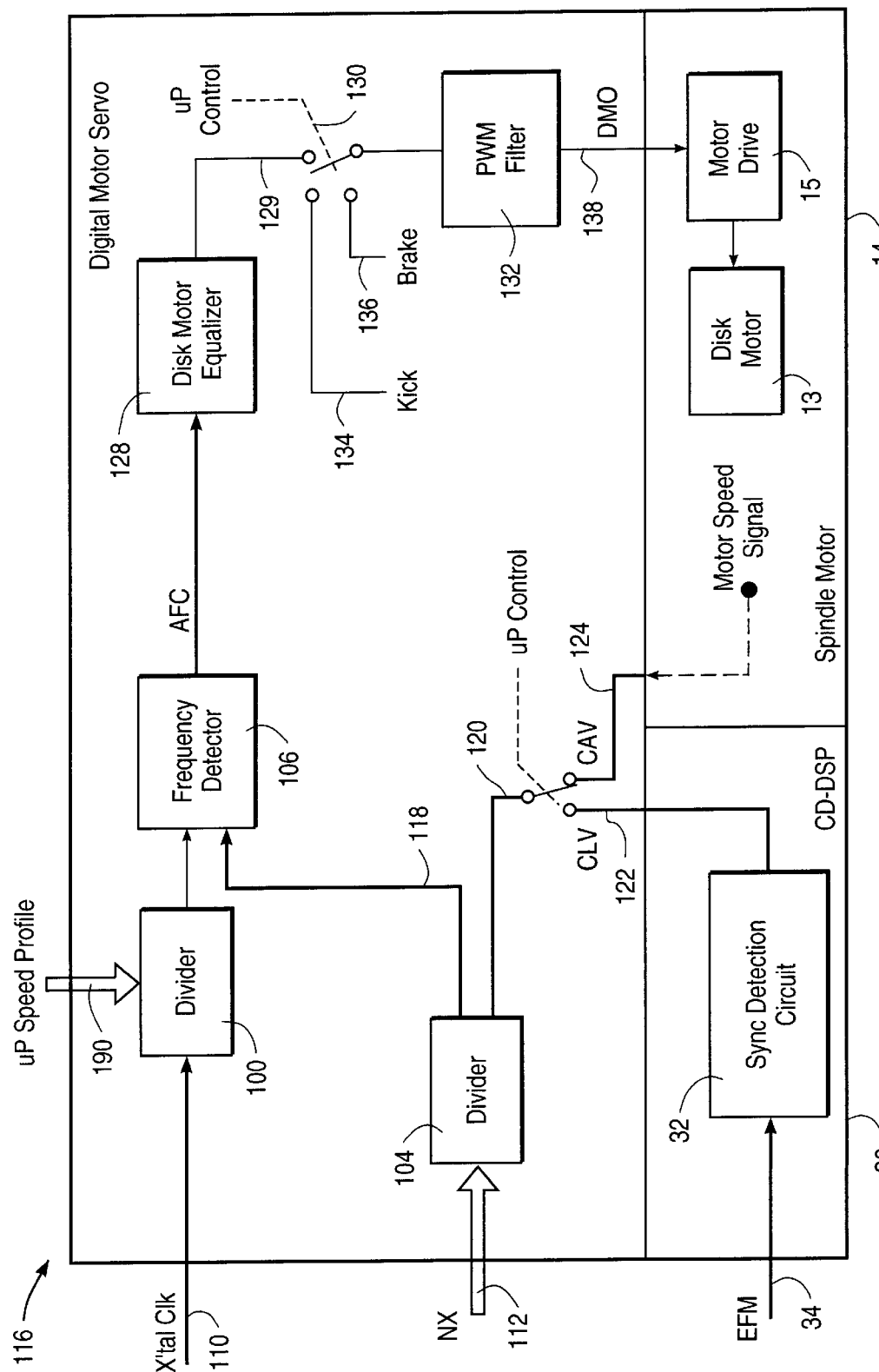
FIG. 4 is a block diagram of one embodiment of the disk motor servo of the present invention.

Referring now to FIG. 4, there is shown a block diagram of disk motor servo 116 of the present invention, and related circuitry. Disk motor servo 116 operates in a CAV/CLV scheme using speed profile information provided by microprocessor controller 40 (shown in FIG. 1). Mode selection switch 120 of disk motor servo 116, controlled by microprocessor controller 40, selects between CAV mode or CLV mode. Switch 120 is connected to lead 122 for CLV control, as specified by the speed profile. When CLV control is selected, disk motor servo 116 receives the subcode sync signal from CP-DSP circuit 30. As illustrated in FIG. 4, the subcode sync signal is generated from the EFM signal on lead 34 by sync detection circuit 32 in CD-DSP 30. Conversely, switch 120 is connected to lead 124 for CAV control during all search operations and when indicated by the programmed speed profile, for example when reading in the CAV mode, such as is shown in FIG. 3—3 for tracks located towards the inner diameter of the CD-ROM. When switch 120 is at the CAV position, the motor speed signal is transmitted on lead 124 to disk motor servo 116.

When operated in the CAV mode, disk motor servo 116 of the present invention relies on a motor speed signal to determine the rotational speed of the motor. In one embodiment, a Hall Effect sensor is used to sense the speed of disk motor 13 and provides the motor speed signal, and in another embodiment the motor driver 15 is a so-called "sensorless" motor driver, and the motor speed signal is provided through back-EMF sensing. Such use of Hall Effect sensors and "sensorless" motors is known in the art for the purposes of providing the proper commutation for use with a brushless DC motor serving as disk motor 13. Any other suitable motor speed signal can be used as well, such as the use of a transducer (such as optical or magnetic) associated with the motor shaft or other rotating element of the optical disk drive.

The motor speed signal is transmitted through switch 120 to divider 104. Divider 104 performs a scaling function on the motor speed signal, if desired. Because the linear velocity differs for a 4x drive and a 8x drive, the speed feedback signal is, in one embodiment, scaled down to the 1x subcode frequency of 7.35 kHz to enable a direct comparison with the desired values. Divider 104 provides the appropriate division based on the scale factor NX received on input bus 112 from microprocessor controller 40 (FIG. 1). The output pulse (frequency) of divider 104 represents the present speed of the motor rotation and forms one input to frequency error detector 106. The other input of frequency error detector 106 is a reference frequency clock which represents the desired motor speed at the target track. Divider 100 generates the reference frequency clock by dividing the crystal clock signal CLK received on clock lead 110 with a value provided on bus 190, which value is based on the microprocessor speed profile table. Frequency error detector 106 compares the two input frequencies and generates an Automatic Frequency Control (AFC) signal representing the frequency error between the reference (desired) target track speed frequency and the frequency representing actual motor speed.

The AFC signal is coupled to disk motor equalizer 128, such as a lead-lag compensator to generate the control signals for the disk motor driver 15, as is known in the prior art. The output lead 129 of disk motor equalizer 128 is connected to one input of switch 130. When motion selection switch 130 is connected to equalizer output lead 129 and mode selection switch 120 is connected to lead 124, disk motor servo 116 of this embodiment operates in a closed loop control mode and frequency error detector 106, through a PWM and filter and motor driver 15, adjusts the rotational speed of disk motor 13 so that it rotates at the desired speed. In other words, the motor speed signal is used as a feedback signal to maintain a substantially zero AFC value. Unlike the prior art, where any necessary increase or decrease in the speed of the disk motor is performed by a corresponding kick or brake operation, respectively, in an open loop control, disk motor servo 116 of the present invention performs all gross motor speed adjustments (i.e. all motor speed adjustments other than those small motor speed adjustments which occur rather "gracefully" during reading in CLV mode) via closed loop control in order to maintain accurate and fast control of the motor speed. In one embodiment, the kick and brake operations are preserved in servo 116 mainly for testing and calibration purposes, and are selected by switch 130. The control signals for motor driver 15, whether originated from disk motor equalizer 128, Kick, or Brake, are coupled through switch 130 to pulse width modulator (PWM) filter 132. PWM filter 132 performs a digital to analog conversion and generates a drive (DMO) signal based on the control signals received from switch 130. The DMO signal is coupled through lead 138 to motor driver 15.

Figure 5:
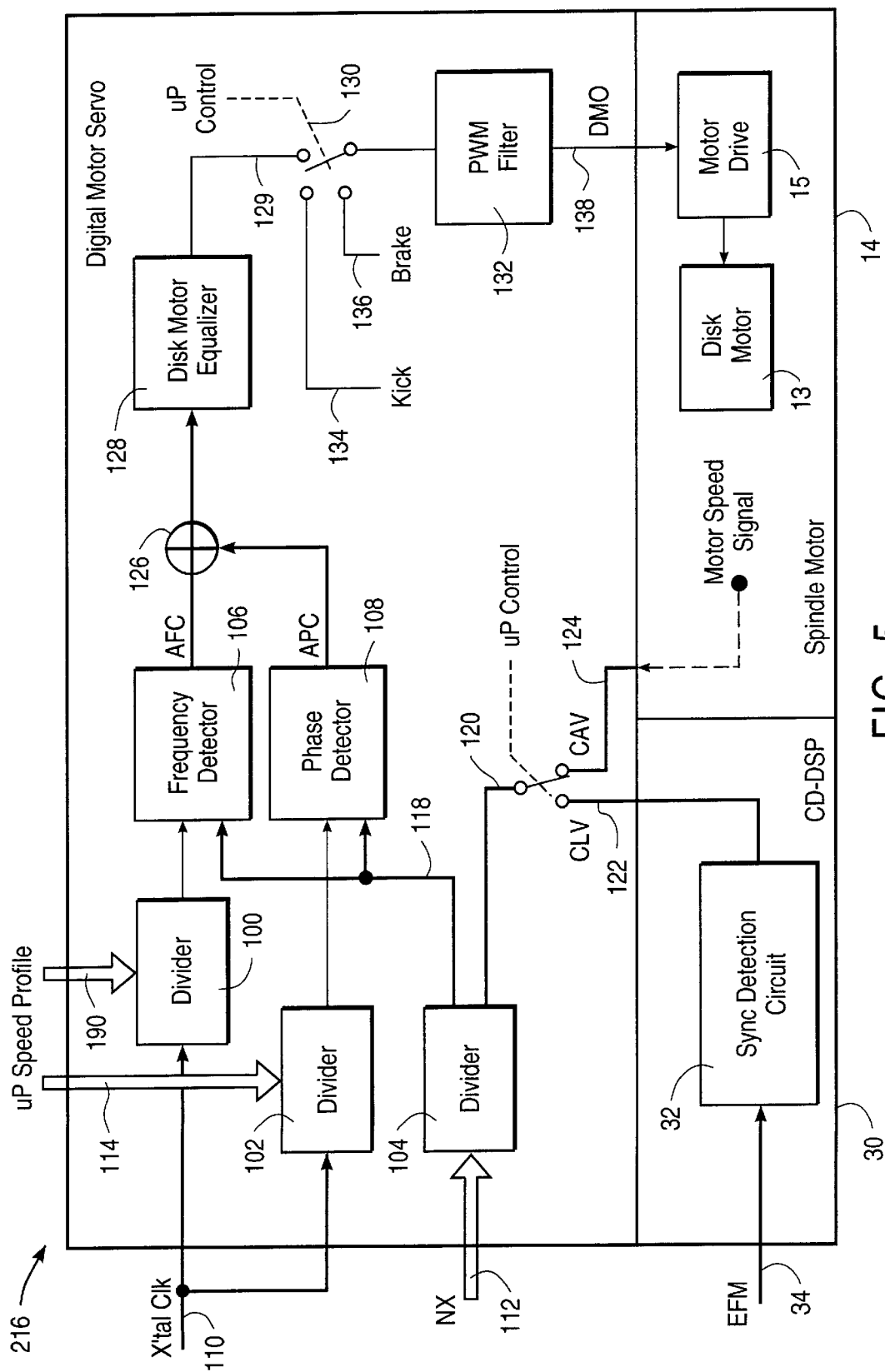
FIG. 5 is a block diagram of a second embodiment of the disk motor servo of the present invention.

FIG. 5 shows a block diagram of another embodiment of a disk motor servo of the present invention, referred to by reference numeral 216. In FIG. 5, the same reference numbers are used to identify like elements corresponding to those in the embodiment of FIG. 4 and will not be further described. In addition to frequency error detector 106 for detecting frequency error, phase detector 108 is included to compare the phase difference between a reference frequency derived from clock signal CLK from lead 110 divided by divider 102 based on a factor received from microprocessor controller 40 (FIG. 1) on bus 114, and the motor speed, as represented by the signal from divider 104, as previously described. Phase detector 108 generates an automatic phase control (APC) signal representing the phase error. The APC signal is coupled to summer 126 and is summed with the AFC signal generated by frequency error detector 106. The sum of the two error signals is used by disk motor equalizer 128 to generate the corresponding control signals for motor driver 15.

The operation of the present invention will now be described with reference to FIGS. 1, 3 and 4. When a track search operation is initiated, microprocessor controller 40 determines the current position of the pickup unit 20 and calculates the distance to be traversed to reach the target track. Microprocessor controller 40 supplies the track traversal information to tracking servo 24 for commanding feed motor 22 to move optical pickup unit 20. Microprocessor controller 40 also looks up the desired rotational speed for spindle motor 14 from the speed profile table stored in its memory and supplies the desired speed information to disk motor servo 116 (FIG. 4 embodiments) or 216 (FIG. 5 embodiments). Regardless of the mode of operation, microprocessor controller 40 commands switch 120 to switch to the CAV position whenever a search is initiated. One feature of the present invention is that all search operations are performed under closed loop motor speed control. In order words, all speed adjustments are made under closed loop control, allowing disk motor servo 116 (or 216) to accurately control the rotational speed of spindle motor 14. Under closed loop control, disk motor servo 116 (or 216) continuously adjusts the speed of motor 14 towards the desired speed while optical pickup 20 is traversing the disk. In most instances, when optical pickup 20 arrives at the target track, motor 14 has also reached the desired rotational speed for that track location and CD-DSP 30 can commence data retrieval without delay. The closed loop control employed by disk motor servo 160 of the present invention eliminates the under speed and over speed in rotational speed associated with the prior art open loop kick and brake control. The present invention is thus able to achieve an improvement in access time as compared to prior art systems.

After the search is initiated and switch 120 is connected to CAV control, the motor speed feedback signal is transmitted to divider 104 for scaling. The scaled motor frequency is compared with the reference frequency obtained from the microprocessor profile table. The discrepancy between the actual motor frequency and the reference frequency is fed to disk motor equalizer 128 for adjusting the speed of the disk motor 13 until motor 14 locks onto the reference frequency, or in other words, until the frequency error AFC is substantially null.

After optical pickup unit 20 arrives at the target track, microprocessor controller 40 determines from the speed profile table whether the target track is in the CAV regime or the CLV regime. If the target track is in the CAV regime, then switch 120 remains connected to CAV control and CD-DSP 30 begins reading data from CD-ROM disk 12. In the CAV regime, disk motor servo 116 (or 216) operates to maintain a constant angular velocity of spindle motor 14 while the linear velocity and thus the data transfer rate varies with the radius of the disk. Sync detection circuit 32 of CD-DSP 30 detects the clock frequency of the incoming EFM feedback signal and adjusts the data transfer rate to match the frequency of the EFM signal. If the target track is in the CLV regime, then microprocessor controller 40 commands mode selection switch 120 to connect to CLV control. Disk motor servo 160 fine-tunes the rotation speed of disk motor 13 to maintain a constant linear velocity. In the CLV regime, disk servo motor 160 relies on the subcode sync signal from CD-DSP 30 to monitor the linear velocity of disk motor 13.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method for operating an optical disk drive comprising the steps of:

rotating a motor at a first speed corresponding with a first track of data being read from an optical disk contained within said optical disk drive and being turned by said motor;

determining a second track of said optical disk which is to be read;

determining a second speed, different than said first speed, at which it is desired to rotate said motor for reading said second track of said optical disk;

providing digital speed profile data corresponding to said second speed;

changing the speed of said motor to said second speed, while using said digital speed profile data in combination with motor speed data indicative of the actual speed of said motor in order to produce a motor speed error signal to control the speed of said motor under closed loop control; and when the speed of said motor reaches said second motor speed, within an acceptable tolerance range, reading data from said second track, wherein, upon said step of reading data from said second track, the speed of said motor continues to be controlled by said speed profile data and said motor speed data under closed loop control.

2. A method as in claim 1 wherein said motor speed data is derived from a Hall Effect sensor associated with a rotating member of said optical disk drive.

3. A method as in claim 1 wherein said motor speed data is derived from back EMF of said motor.

4. A method as in claim 1 wherein said speed profile data defines a division factor for dividing a reference clock to provide a divided down clock signal serving to define said second motor speed.

5. A method as in claim 1 wherein said speed profile data defines a division factor for dividing a reference clock to provide a divided down clock signal serving to define said second motor speed, said divided down clock signal and said motor speed data are fed to a frequency detector in order to derive a frequency error signal for controlling the speed of said motor.

6. A method as in claim 5 wherein said divided down clock signal and said motor speed data are fed to a phase detector to derive a phase error signal, said phase error signal is summed with said frequency error signal for controlling the speed of said motor.

7. A method as in claim 1 wherein said motor speed data is scaled to a frequency substantially equivalent to a 1× data synchronization frequency of said optical disk.

8. A method as in claim 1 wherein said motor comprises a brushless DC motor.

9. An optical disk drive for reading information from an optical disk on which information has been recorded in a spiral format comprising:

a motor for rotating said optical disk;

a disk motor servo for controlling the speed of said motor;

an optical pickup for reading signals produced by data stored on said optical disk;

a digital signal processor for performing signal processing on said digital signals read by said read means; and a controller that generates a mode control signal for controlling said disk motor servo to rotate said motor in either a constant linear velocity mode or a constant angular velocity mode, said disk motor servo being configured to change the speed of said motor from a first speed corresponding with a first track of data on said optical disk to a second speed corresponding with a second track of data on said optical disk under closed loop control, and maintain said second speed under closed loop control as said second track of data is read and memory for storing digital speed profile data representing a predetermined motor speed of said motor corresponding to each track of data on said optical disk, wherein said first and second speeds are defined by said digital speed profile data and said controller generates said mode control signal based on said digital speed profile data.

10. An optical disk drive as in claim 9 wherein said disk motor servo changes the speed of said motor in accordance with said digital speed profile data and motor speed data.

11. An optical disk drive as in claim 9 wherein, upon reaching said second track, said disk motor servo changes the speed of said motor by synchronization with data signals read from said second track.

12. An optical disk drive as in claim 9 wherein said disk motor servo comprises:

a mode selection switch controlled by said mode control signal for selecting between said constant linear velocity mode and said constant angular velocity mode;

a detector for generating a speed error signal based on said digital speed profile data and motor speed data indicative of the actual speed of said motor; and motor control circuitry for generating motor control signals in accordance with said speed error signal to change the speed of said motor.

13. An optical disk drive as in claim 12 wherein said disk motor servo further comprises:

a divider for dividing a reference clock according to a division factor to provide a divided down clock signal serving to define said second motor speed; and a frequency detector for deriving a frequency error signal based on said divided down clock signal and said motor speed data of said motor.

14. An optical disk drive as in claim 13 wherein said disk motor servo further comprises a phase detector for deriving a phase error signal based on said divided down clock signal and said motor speed data of said motor, said phase error signal being summed with said frequency error signal for controlling said motor control circuitry.

15. An optical disk drive as in claim 12 wherein said disk motor servo further comprises a frequency divider for scaling said motor speed data down to a frequency substantially equivalent to a 1× data synchronization frequency of said optical disk.

16. An optical disk drive as in claim 12 which further comprises motor speed detection circuitry comprising a Hall Effect sensor associated with a rotating member of said optical disk drive, for providing said motor speed data.

17. An optical disk drive as in claim 12 which further comprises motor speed detection circuitry comprising circuitry to monitor the back EMF of said motor, for providing said motor speed data.

18. An optical disk drive as in claim 9 wherein said disk motor comprises a brushless DC motor.

* * * * *